(12) United States Patent
Nicholson

(10) Patent No.: US 6,990,270 B2
(45) Date of Patent: Jan. 24, 2006

(54) FIBER AMPLIFIER FOR GENERATING FEMTOSECOND PULSES IN SINGLE MODE FIBER

(75) Inventor: Jeffrey Nicholson, Chatham, NJ (US)

(73) Assignee: Fitel U.S.A. Corp., Norcross, GA (US)

( * ) Notice: Subject to any disclaimer, the term of this patent is extended or adjusted under 35 U.S.C. 154(b) by 8 days.

(21) Appl. No.: 10/776,432

(22) Filed: Feb. 11, 2004

(65) Prior Publication Data

US 2005/0175280 A1 Aug. 11, 2005

(51) Int. Cl.
*G02B 6/00* (2006.01)
*G02B 6/26* (2006.01)

(52) U.S. Cl. .............................. 385/27; 372/6; 398/42
(58) Field of Classification Search .................. 385/24, 385/27, 30–31, 50, 129, 147, 127; 359/333, 359/347, 348, 349, 341; 372/21, 22, 6, 25; 398/42, 43, 48, 79, 81, 82
See application file for complete search history.

(56) References Cited

U.S. PATENT DOCUMENTS

| | | | |
|---|---|---|---|
| 5,499,134 A * | 3/1996 | Galvanauskas et al. ..... | 359/333 |
| 5,696,782 A | 12/1997 | Harter et al. | |
| 5,880,877 A * | 3/1999 | Fermann et al. ........ | 359/341.31 |
| 5,933,271 A | 8/1999 | Waarts et al. | |
| 6,014,249 A | 1/2000 | Fermann et al. | |
| 6,104,528 A | 8/2000 | Hwang | |
| 6,549,547 B2 | 4/2003 | Galvanauskas et al. | |
| 2003/0156605 A1 * | 8/2003 | Richardson et al. .......... | 372/25 |

OTHER PUBLICATIONS

D.J. Richardson, V.V. Afa Nasjev, A.B. Grundinin, D.N. Payne, "Amplification of Femtosecond Pulses in a Passive, All-Fiber Soliton Source", Optics Letters, vol. 17, No.22, Nov. 15, 1992.

M.E. Fermann, V.I. Kruglov, B.C. Thomps .N, J.M. Dudley, J.D. Harvey, "Self-Similar Propagation and Amplification of Parabolic Pulses in Optical Fibers", Physical Review Letters, vol. 84, No. 26, Jun. 26, 2000.

K. Tamura, E. Yoshida, T. Sugawa, M. Nakazawa, "Broadband Light Generation by Femtosecond Pulse Amplification With Stimulated Raman Scattering in a High-Power Erblum-Doped Fiber Amplifier" Optics Letters, vol. 20, No. 15, Aug. 1, 1995.

V.I. Kruglov, A.C. Peacock, J.D. Harvey, J.M. Dudley, "Self-Similar Propagation of Parabolic Pulses in Normal-Dispersion Fiber Amplifiers", J. Optical Soc. Am.B., vol. 19, No. 3, Mar. 2002.

Almantas Galvanauskas "Mode-Scalable Fiber-Based Chirped Pulse Amplification Systems", IEEE Journal on Selected Topics in Quantum Electronics, vol. 7, No. 4, Jul./Aug. 2001.

(Continued)

*Primary Examiner*—Akm Enayet Ullah

(57) ABSTRACT

A source of high-power femtosecond optical pulses comprises a combination of a relatively short rare-earth doped fiber amplifier (e.g., less than five meters) with a first section of single mode fiber (or other dispersive element) disposed at the input of the amplifier to "pre-chirp" the output from a femtosecond pulse source, and a second section of single mode fiber fused to the output of the fiber amplifier to provide compression to the amplified pulses generated by the fiber amplifier. The rare-earth doped fiber amplifier is formed to comprise a normal dispersion, which when combined with self-phase modulation and distributed gain leads to a regime in amplifiers defined as "self-similar propagation". In this regime of operation, the fiber amplifier generates high energy pulses with a parabolic shape (the parabolic shape defined as a function of time). These pulses also exhibit a strong linear chirp, where the linear nature of the chirp leads to efficient compression of the pulses.

18 Claims, 3 Drawing Sheets

OTHER PUBLICATIONS

Florian Tauser, Alfred Leitenstorfer, Wolfgang Zinth, "Amplified Femtosecond Pulses From an Er:fiber System: Nonlinear Pulse Shortening and Self-Referencing Detection of the Carrier-Envelope Phase Evolution", Optics Express, vol. 11, No. 6, Mar. 24, 2003.

K. Tamura, M. Nakazawa, "Pulse Compression by Nonlinear Pulse Evolution With Reduced Optical Wave Breaking in Erblum—Doped Fiber Amplifiers", Optics Letters, vol. 21, No. 1, Jan. 1, 1996.

J.W. Nicholson, M.F. Yan, P. Wisk, J. Fleming, F. Dimarcello, E. Monberg, and A. Yablon, C. Jorgensen, T. Veng, "All-Fiber, Octave—Spanning Super Continuum", Optics Letters, vol. 28, No. 8, Apr.15, 2003.

\* cited by examiner

FIBER AMPLIFIER FOR GENERATING FEMTOSECOND PULSES IN SINGLE MODE FIBER

TECHNICAL FIELD

The present invention relates to a source for generating high peak power, femtosecond optical pulses and, more particularly, to the use of an erbium-doped fiber amplifier (EDFA) in combination with sections of single mode fiber (for pre-amplification chirping and post-amplification compression) to generate sub-100 femtosecond (fs) pulses at 1550 nm.

BACKGROUND OF THE INVENTION

Since their first manufacture in the 1980s, single-mode erbium-doped fiber amplifiers (EDFAs) have steadily developed into one of the most widely used solid state laser media. EDFAs were initially used as optical amplifiers in telecommunication systems, and since then have been used as amplifiers for soliton-based communication systems, among others. These applications all have in common a lack of concern with extracting high energy and high peak power pulses from a single mode EDFA.

However, in order to consider fiber lasers as practical sources for most nonlinear optics applications, the power levels generated by convention, prior art cw or quasi-cw systems are not sufficient. For example, for the operation of a typical high-efficiency optical parametric oscillator, sub-picosecond pulses with pulse energies around 10 µJ are needed. Thus, any attempt to introduce rare earth-doped fiber lasers as amplifiers for such systems will adversely affect their operation, since the long lengths of these amplifiers will cause a wide array of prohibitive nonlinear effects and prevent the attainment of pulses with peak powers larger than 1 kW.

The use of a chirped pulse amplification (CPA) technique with fiber amplifiers is a potential solution to the above problem of low energies and powers in fiber laser sources. CPA with fiber amplifiers can successfully utilize the potential of fibers to increase pulse energies and average powers from compact fiber and laser diode sources to the levels comparable to those currently obtainable with many large-frame scientific lasers.

According to the CPA method, ultrashort pulses are stretched prior to amplification, then amplified, and finally recompressed prior to transmission. By amplifying stretched pulses of relatively long duration, the peak power in the amplifier is maintained relatively low such that nonlinear effects and pulse break-up are prevented. However, due to the physical properties of optical fibers and fiber amplifiers, there are a number of problems and limitations to be overcome for implementing CPA in fibers: nonlinear effects in fibers occurring at high peak powers, ASE-limited gain, increase in recompressed-pulse duration due to gain narrowing effect, limited output powers due to limited pump powers, recompression of pulses down to their initial duration using compact compressor and stretcher arrangements, etc. Frequently, a pulse with a large amount of chirp is generated in a fiber amplifier, and then recompressed in bulk optics. Another approach is to amplify pulses in multi-mode fiber, thereby reducing the nonlinearities, by using a mode with a large effective area.

For some applications, however, it is desirable to generate a compressed, femtosecond pulse at the end of a single mode fiber tip. For example, it is desirable to utilize short pulses in an endoscope to generate nonlinear signals for medical imaging applications. Such an application requires the smallest possible mode size at the fiber tip, so as to generate a high intensity and a large nonlinear signal. In applications making use of nonlinear fibers, such as supercontinuum generation, variations in launch conditions can be a problem when focusing into small core nonlinear fibers with bulk optics. Therefore, it is desirable to splice the nonlinear fiber directly to the amplifier output fiber, to minimize such variations. Again, a compressed pulse at the end of a single mode connector is optimal for launch into the nonlinear fiber.

One prior art arrangement for providing amplification of femtosecond pulses in single mode fiber is discussed in the article "Amplification of femtosecond pulses in a passive, all-fiber soliton source", by D. J. Richardson et al., appearing in *Optics Letters*, Vol. 17, No. 22, Nov. 15, 1992, at page 1596 et seq. In this case, the fiber amplifier is characterized as exhibiting an anomalous dispersion, and as such, suffers from pulse collapse and wave breaking. Numerous prior art references further assert that the nonlinearities present in single mode fiber prevent the generation of high power pulses, and as a result either multimode fiber or bulk optic compression is required to generate short, high power pulses.

SUMMARY OF THE INVENTION

The limitations of the prior art as discussed above are addressed by the present invention, which relates to a source for generating high peak power, femtosecond pulses and, more particularly, to the use of an erbium-doped fiber amplifier (EDFA) in combination with sections of single mode fiber for generating sub-100 femtosecond (fs) pulses at 1550 nm.

A preferred embodiment of the present invention comprises a first section of single mode fiber (or another dispersive element) to precondition the phase of a femtosecond pulse emitted from a pulse source, such as an erbium-doped fiber laser, the output of the single mode fiber applied as an input to a relatively short (few meter) length of highly-doped rare-earth fiber with normal dispersion, operating in a regime free of pulse break-up, for generating parabolic pulses (with one or more appropriate pump sources used to provide the amplification in the highly-doped rare-earth fiber amplifier). A relatively short second section of single mode fiber with anomalous dispersion is directly coupled to the output of the fiber amplifier to provide the necessary pulse compression.

In accordance with the present invention, it has been found that the combination of using a rare-earth doped fiber amplifier with normal dispersion, self-phase modulation and distributed gain leads to a regime in amplifiers defined as "self-similar propagation". In this regime of operation, the fiber amplifier generates high energy pulses with a parabolic shape (the parabolic shape defined as a function of time). These pulses also exhibit a strong linear chirp, where the linear nature of the chirp leads to efficient compression of the pulses by using the second section of single mode fiber.

Other and further advantages and aspects of the present invention will become apparent during the course of the following discussion, and by reference to the accompanying drawings.

BRIEF DESCRIPTION OF THE DRAWINGS

Referring now to the drawings.

DETAILED DESCRIPTION

Figure 1:
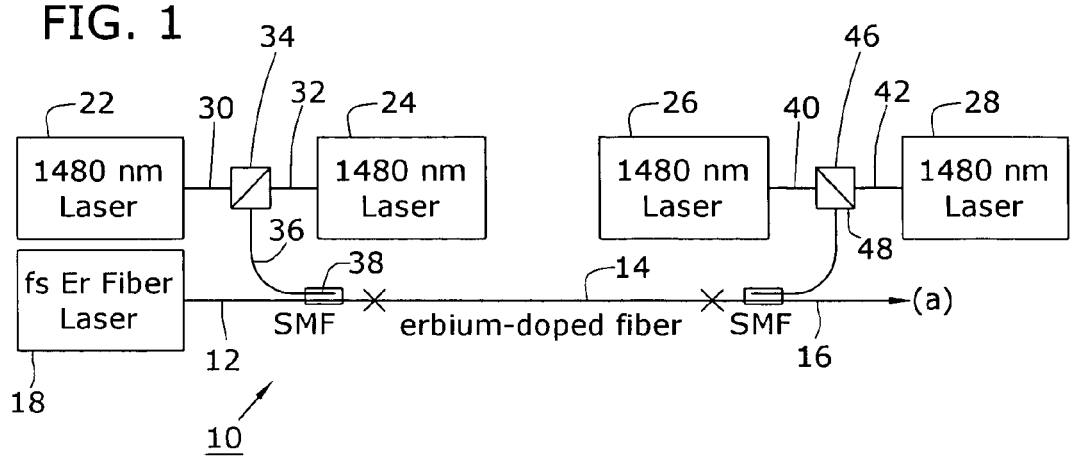
FIG. 1 contains a block diagram of an exemplary high-power, femtosecond pulse source formed in accordance with the present invention.

FIG. 1 illustrates an arrangement 10 for amplifying femtosecond (fs) pulses in accordance with the present invention. In general, arrangement 10 of the present invention comprises three major components: a pre-chirping single mode fiber 12 (or other suitable dispersive element), a rare-earth doped fiber amplifier 14 and a pulse compression single mode fiber 16. In operation, pre-chirping fiber 12 comprises an appropriate length of single mode fiber (or another suitable dispersive element) to precondition the phase of a femtosecond pulses generated by a femtosecond laser pulse source 18. Other suitable dispersive elements that may be used to provide pulse preconditioning include, for example, a Bragg grating, preferably a fiber Bragg grating or tunable fiber Bragg grating. Rare-earth doped fiber amplifier 14 comprises a relatively short (e.g., a few meters, nominally less than five meters) length of highly doped rare-earth fiber with normal dispersion, operating in a regime free of pulse break-up, thus generating parabolic pulses. One or more pump sources, as discussed below, are used to provide amplification in fiber amplifier 14. Pulse compression fiber 16 comprises a length (again, relatively short, on the order of tens of centimeters) of single mode fiber with anomalous dispersion.

In accordance with the present invention, femtosecond laser pulse source 18 may comprise a modelocked fiber laser capable of generating, for example, 2 mW, 250 fs pulses at 46 MHz. Femtosecond erbium fiber lasers, such as source 18, generally produce pulses with strong chirp at the output of the included oscillator (not shown). Therefore, for optimum amplifier operation in accordance with the present invention, the length of pre-chirping single mode fiber 12 must be carefully chosen to produce a pulse with appropriate phase at the input of amplifier fiber 14, so as to reach the desired parabolic regime as quickly as possible. For example, a pre-chirping single mode fiber 12 of a length of approximately two meters has been found appropriate for the application of the present invention.

An important issue in the amplification of femtosecond pulses in single mode fiber is the prevention of pulse breakup in the amplifier due to nonlinearities. A solution to this problem, in accordance with the present invention, is the use of relatively short (less than five meters) length of erbium-doped fiber with normal dispersion as the amplifier. Amplifiers using anomalous dispersion are known to suffer from pulse collapse and wave breaking. However it has recently been shown that the combination of normal dispersion, self-phase modulation and distributed gain leads to a regime in amplifiers defined as "self-similar propagation". In this region of operation, the amplifier generates high energy pulses with a parabolic shape in time. These pulses also exhibit a strong linear chirp. It is the linear nature of the chirp which leads to efficient compression of the pulses post-amplification, as discussed below.

The arrangement as illustrated in FIG. 1 utilizes a set of four separate pump sources 22, 24, 26 and 28 as inputs to fiber amplifier 14. It is to be understood, however, that any conventional pump arrangement can be used with the fiber amplifier portion of arrangement 10 of the present invention. The use of four separate pump sources, pumps 22 and 24 disposed as co-propagating with the pulse output signal from fiber laser source 18, and pumps 26 and 28 disposed as counter-propagating with respect to the pulse output signal from fiber laser source 18, provides for maximum pump power to be present in fiber amplifier 14. In the particular arrangement 10 of the present invention as shown in FIG. 1, the output signals from pump lasers 22 and 24 are controlled to be orthogonal in polarization state, propagating along separate sections of polarization maintaining fiber 30 and 32, then combined in a polarization multiplexer 34 and applied along a single section of polarization maintaining fiber 36. The pair of orthogonally polarized pump signals are then applied as a first input to a wavelength division multiplexer (WDM) 38 disposed along pre-chirped single mode fiber 12, so as to be combined with the pulse output from fiber laser source 18. The output signals from pump sources 26 and 28, in a similar fashion, are of orthogonal polarization states, and propagate along separate sections of polarization maintaining fiber 40 and 42, thereafter combined in a polarization combined 44 and coupled into a polarization maintaining fiber 46. The pair of polarized pump signals are then provided as an input to a second WDM 48 and launched in a counter-propagating direction along rare-earth doped fiber amplifier 14.

In one arrangement of the present invention, rare-earth doped fiber amplifier may comprise a two meter long section of erbium-doped fiber, which is pumped with the above-described set of four separate pump sources, each pump source operating at the pump wavelength of 1480 nm. Simulations show that even shorter amplifiers (i.e., on the order of one meter or less) may perform better than the exemplary two meter model. For amplifiers of the present invention having lengths greater than about five meters, higher-order nonlinearities begin to come into play, and stimulated Raman scattering (SRS) begins to limit the amplifier performance. Referring back to FIG. 1, the maximum launched power of this four pump configuration is found to be 610 kW for the co-propagating pump sources 22 and 24, and 571 mW for the counter-propagating pump sources 26 and 28. Erbium-doped fiber amplifier 14 is designed to exhibit normal dispersion. As mentioned above, it has been found that the combination of distributed gain, normal dispersion and self-phase modulation with a doped fiber amplifier leads to self-similar propagation, where the pulses acquire a parabolic shape in time and exhibit linear chirp.

The parabolic regime of operation is extremely useful, as almost any pulse launched into fiber amplifier 14 ultimately reshapes itself into a parabolic pulse. However, the distance the pulse must travel before entering the region where it approaches the asymptotic parabolic solution is very different, depending on the initial pulse shape. Femtosecond erbium fiber laser sources, such as source 18, generally produce pulses with strong chirp at their output. Thus, as mentioned above, for ideal amplifier operation, the length of pre-chirping single mode fiber 12 must be carefully designed to produce a pulse with the appropriate phase at the input of fiber amplifier 14 in order to reach the parabolic regime as quickly as possible.

The output pulses from erbium doped fiber amplifier 14 are free from breakup, and can be efficiently compressed with bulk optics. The preferred, all-fiber arrangement, however, utilizes single mode fiber 16 to recompress the pulses, leading to high peak powers in a section of single mode fiber (where, as stated above, the use of single mode fiber is preferred for many new and upcoming applications). Indeed, a preferred all-fiber embodiment may utilize single mode polarization maintaining fiber. Another advantage of keeping the amplifier short is that it also keeps compression fiber 16 short (for example, less than 20 cm), minimizing distortions in the pulses, as the nonlinearities shorten the length of compression fiber that is required.

Figure 2:
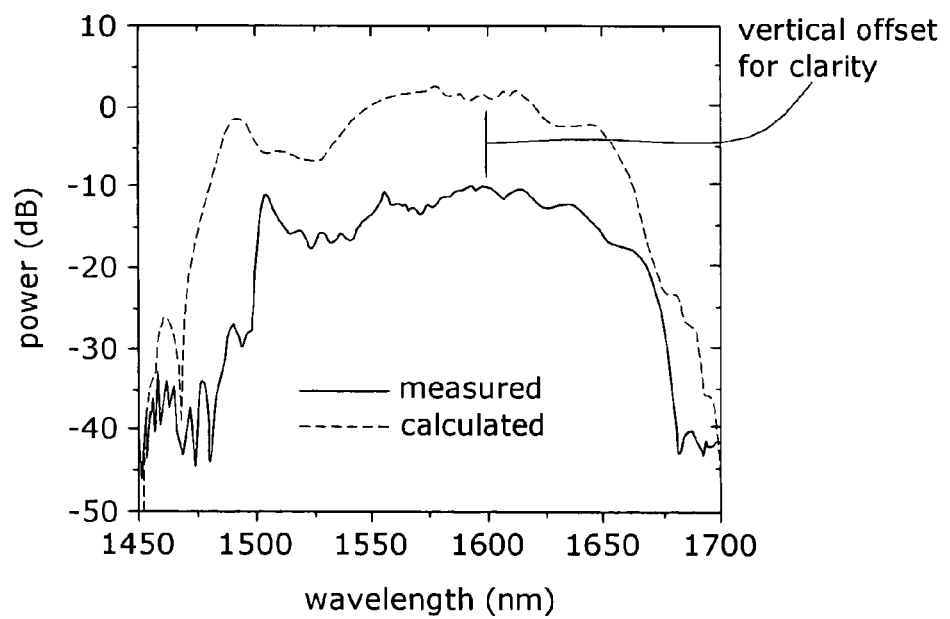
FIG. 2 illustrates a plot of the measured output spectrum for the arrangement of FIG. 1, as well as the nonlinear Shrodinger equation (NLSE) calculation of the amplifier spectrum.

FIG. 2 illustrates the spectrum measured at the output of the arrangement of the present invention as shown in FIG. 1, using a single mode pre-chirping fiber 12 of less than 20 cm in length. The maximum output power of the amplified pulses at the output of fiber amplifier 14 was found to be 400 mW (8.7 mJ/pulse). A calculation of the amplifier output spectrum, from a nonlinear Schrodinger equation (NLSE) model including gain, is plotted as a dotted line in FIG. 2, for the sake of comparison. The model is offset vertical, for clarity, and illustrates good agreement between the model and the measured spectrum.

Figure 3:
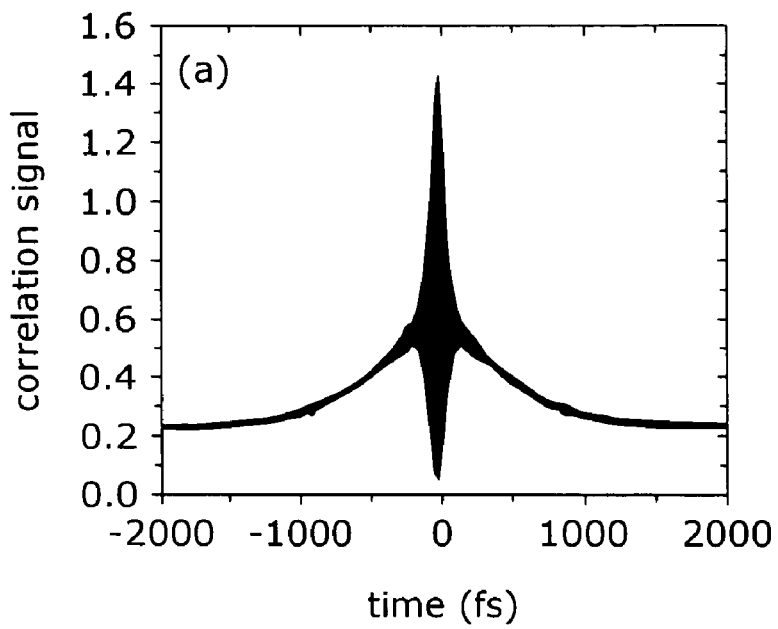
FIG. 3 is a graph of the measured interferometric correlation present at the output of the erbium-doped fiber amplifier portion of the pulse source of FIG. 1.
Figure 4:
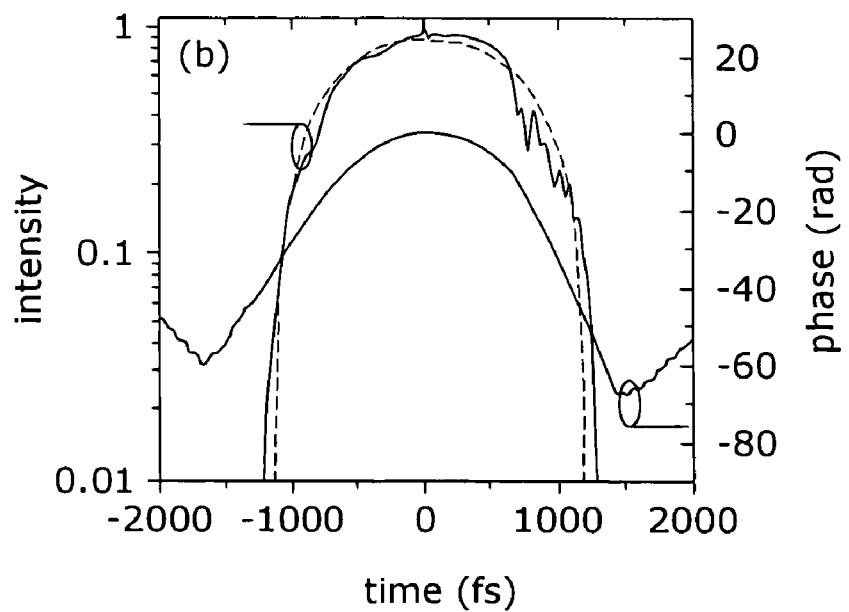
FIG. 4 is a simulation of the pulse intensity and phase (using NLSE) at the amplifier output, illustrating the fit of a parabolic curve to the pulse intensity.

The measured interferometric correlation at the output of fiber amplifier 14 is plotted in the graph of FIG. 3, which illustrates the autocorrelation signal as a function of time. This plot illustrates that the output consists of a single, highly-chirped pulse. NLSE simulations of the pulse intensity and phase, as shown in FIG. 4, illustrate that the pulses are approximately parabolic with quadratic phase. The dashed line in FIG. 4 is used to shown a parabolic fit to the pulse intensity. In its most accurate form, higher-order terms, such as self-steepening, will cause deviations from a true parabolic shape.

Figure 5:
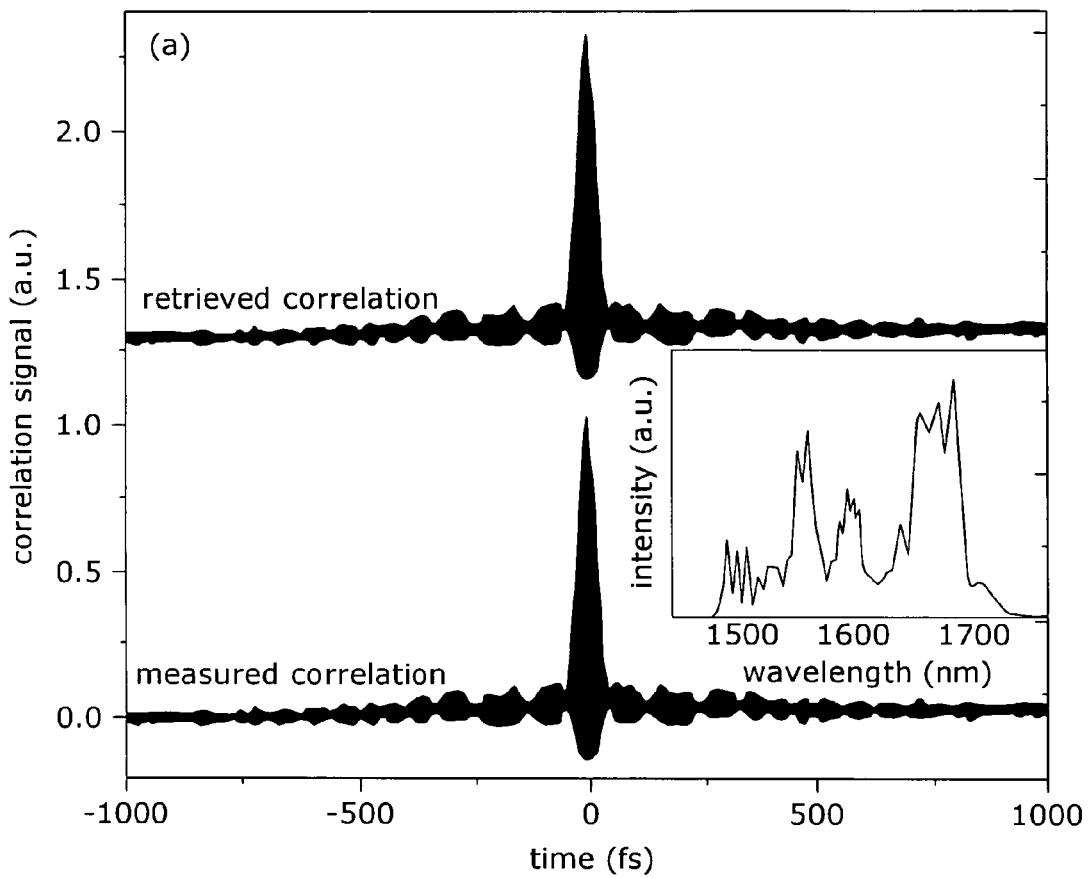
FIG. 5 contains a graph of the measured interferometric correlation present at the output of the pulse compression single mode fiber, as compared to retrieved correlation (for the spectrum illustrated in the insert)
Figure 6:
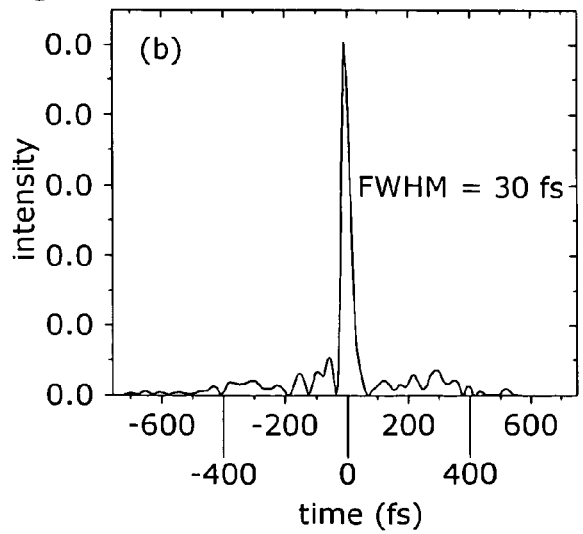
FIG. 6 is a graph of the retrieved intensity corresponding to the correlation in FIG. 5, showing in particular a 30 fs pulse.

The optimum length of single mode pulse compression fiber 16, using one exemplary experimental arrangement, was found to be 45 cm (including the presence of the pump/signal combining WMD). The measured interferometric autocorrelation and spectrum appearing at the output of pulse compression fiber 16 are illustrated in FIG. 5, the spectrum illustrated as an insert. The spectrum and interferometric correlation were input into a known analysis algorithm to retrieve the pulse intensity and phase. The retrieved pulse, illustrated in FIG. 6, consisted of a 30 fs pulse on a low pedestal of minimal intensity. Approximately 55% of the energy is shown as appearing in the central pulse, giving a peak power of approximately 160 kW. An advantage of the arrangement of the present invention is that these 30 fs pulses, with 160 kW peak power, as appearing at the output of a section of single mode fiber (that is, compression fiber 16), can then be used in situations requiring a single mode fiber termination (such as an endoscope), or used for fusion splicing to a nonlinear fiber for supercontinuum generation. Accordingly, the ability to directly fuse the pulse compression fiber to the output of the single mode fiber amplifier results in minimal variations in the pulse compression launch conditions (compared to the conventional use of bulk optics to perform compression), thus optimizing the performance of the arrangement of the present invention.

As mentioned above, an advantage of utilizing a relatively short (tens of cm) fiber amplifier is that it allows for a relatively short compression single mode fiber to be used, minimizing distortion in the output pulse. Paradoxically, in such a system, high power has also been seen to work well in compressing the pulses, as the nonlinearities shorten the length of compression fiber that is required.

Another advantage of the arrangement of the present invention is that as well as amplifying the pulses without pulse breakup, the amplifier also significantly broadens the pulse spectrum. Therefore, relatively long pulses from the fiber laser (e.g., 300 fs) can be used, while at the amplifier output, simulations have shown that such pulses can be compressed in compression single mode fiber 16 to as short as 15 fs.

It is to be understood that although the present invention has been described in conjunction with a preferred embodiment, it will be apparent to those skilled in the art that other alternatives, variations and modifications may be made and still fall within the spirit and scope of the present invention. In particular, various other pump source arrangements can be utilized, such as a single co-propagating pump with a single counter-propagating pump. Moreover, 980 nm laser pump sources can be used in place of 1480 laser pump sources. Additionally, other specific femtosecond laser sources can be used. In general, the spirit and scope of the present invention is intended to be only by the scope of the claims appended hereto.

What is claimed is:

1. An apparatus for generating high-power femtosecond optical pulses, the apparatus comprising
a femtosecond pulse source;
a phase conditioning optical dispersive element coupled to the output of the femtosecond pulse source, the dispersive element having predetermined characteristics chosen to produce a pulse with a desired phase;
a rare-earth doped fiber amplifier coupled to the output of the dispersive element, the rare-earth doped fiber amplifier comprising: a second of rare-earth doped single mode fiber of a predetermined length, at least one source of optical pump power, and at least one wavelength division multiplexer for introducing the output of the at least one source of optical pump power and the output of the dispersive element into the section of rare-earth doped fiber; and
an output section of single mode fiber fused to the output of the rare-earth doped fiber amplifier, the output section of single mode fiber used to compress the output optical pulses from the rare-earth doped fiber amplifier.

2. The apparatus as defined in claim 1 wherein i:he rare-earth doped fiber amplifier comprises an erbium-doped fiber amplifier.

3. The apparatus as defined in claim 1 wherein the femtosecond pulse source comprises a modelocked rare-earth doped fiber laser.

4. The apparatus as defined in claim 3 wherein the modelocked rare-earth doped fiber laser comprises a modelocked erbium-doped fiber laser.

5. The apparatus as defined in claim 1 wherein the phase conditioning optical dispersive element comprises an input section of single mode fiber.

6. The apparatus as defined in claim 5 wherein the input section of single mode fiber comprises a length of at most two meters.

7. The apparatus as defined in claim 1 wherein the phase conditioning optical dispersive element comprises a Bragg grating.

8. The apparatus as defined in claim 7 wherein the Bragg grating comprises a fiber Bragg grating.

9. The apparatus as defined in claim 8 wherein the fiber Bragg grating comprises a tunable fiber Bragg grating.

10. The apparatus as defined in claim 1 wherein the rare-earth doped fiber amplifier comprises a pair of co-propagating pump sources and a pair of counter-propagating pump sources.

11. The apparatus as defined in claim 10 wherein the pair of co-propagating pump sources generate orthogonally polarized pump signals and the fiber amplifier further comprises a polarization combiner for combining the orthogonally polarized pump signals onto a single section of polarization maintaining fiber, the output of the single section of polarization maintaining fiber applied as a first input to a wavelength division multiplexer, the output of the dispersive element applied as a second input to the wavelength division multiplexer.

12. The apparatus as defined in claim 10 wherein the pair of counter-propagating pump sources generate orthogonally polarized pump signals and the fiber amplifier further comprises a polarization combiner for combining the orthogonally polarized pump signals onto a single section of polarization maintaining fiber, the output of the single section of polarization maintaining fiber applied as a first input to a wavelength division multiplexer so as to provide the pair of orthogonally polarized pump signals as a counter-propagating input along the fiber amplifier.

13. The apparatus as defined in claim 1 wherein the output section of single mode fiber comprises a length less than 50 cm.

14. The apparatus as defined in claim 1 wherein the section of rare-earth doped single mode fiber of the fiber amplifier comprises a length of less than five meters.

15. The apparatus as defined in claim 14 wherein the length of the erbium-doped single mode fiber is at most two meters.

16. The apparatus as defined in claim 1 wherein the at least one source of optical pump power provides a pump signal at a wavelength of 1480 nm.

17. The apparatus as defined in claim 1 wherein the at least one source of optical pump power provides a pump signal at a wavelength of 980 nm.

18. The apparatus as defined in claim 1 wherein the dispersive element, rare-earth doped fiber amplifier and output section of single mode fiber all comprise polarization maintaining fiber.

* * * * *